US012722136B1

(12) United States Patent
Saratovsky et al.

(10) Patent No.: US 12,722,136 B1
(45) Date of Patent: Sep. 1, 2026

(54) HYDRATED LIME FOR CARBON CAPTURE

(71) Applicant: Lhoist North America, Inc., Fort Worth, TX (US)

(72) Inventors: Ian Saratovsky, Highland Park, IL (US); Kevin Dean Ingram, Fort Worth, TX (US); Susanna Helena Minnaar, Keller, TX (US)

(73) Assignee: Lhoist North America, Inc., Fort Worth, TX (US)

( * ) Notice: Subject to any disclaimer, the term of this patent is extended or adjusted under 35 U.S.C. 154(b) by 0 days.

(21) Appl. No.: 19/327,326

(22) Filed: Sep. 12, 2025

Related U.S. Application Data

(60) Division of application No. 19/098,873, filed on Apr. 2, 2025, now Pat. No. 12,544,734, which is a (Continued)

(51) Int. Cl.

| | |
|---|---|
| ***B01J 20/04*** | (2006.01) |
| ***B01D 53/04*** | (2006.01) |
| ***B01J 20/08*** | (2006.01) |
| ***B01J 20/24*** | (2006.01) |
| ***B01J 20/28*** | (2006.01) |

(52) U.S. Cl.
CPC ........ *B01J 20/041* (2013.01); *B01D 53/0462* (2013.01); *B01J 20/08* (2013.01); *B01J 20/24* (2013.01); *B01J 20/28078* (2013.01); *B01D 2251/404* (2013.01); *B01D 2251/604* (2013.01); *B01D 2253/1124* (2013.01); *B01D 2253/202* (2013.01); *B01D 2253/306* (2013.01); *B01D 2253/308* (2013.01); *B01D 2253/311* (2013.01); *B01D 2257/504* (2013.01); *B01J 20/28059* (2013.01); *B01J 20/28071* (2013.01); *B01J 2220/42* (2013.01)

(58) Field of Classification Search
CPC . B01J 20/041; B01J 20/08; B01J 20/24; B01J 20/28078; B01D 53/0462
USPC .......................................................... 502/414
See application file for complete search history.

(56) References Cited

U.S. PATENT DOCUMENTS

| | | |
|---|---|---|
| 10,669,199 B2 | 6/2020 | Chini et al. |
| 11,331,646 B2 | 5/2022 | Lorgouilloux et al. |

(Continued)

FOREIGN PATENT DOCUMENTS

| | | |
|---|---|---|
| CN | 114904481 A | 8/2022 |
| WO | 2017220161 A1 | 12/2017 |

(Continued)

OTHER PUBLICATIONS

Safety Data Sheet, Hydrated Lime, Jan. 27, 2020, Lhoist North America, Inc. and Lhoist North America of Canada, Inc., 8 pages.

(Continued)

*Primary Examiner* — Anita Nassiri-Motlagh
(74) *Attorney, Agent, or Firm* — Baker Botts L.L.P.

(57) ABSTRACT

The present disclosure relates to compositions and methods for lime-based carbon capture. The composition comprises a calcium hydroxide component having a specific surface area of at least about 30 $m^2/g$; free moisture in an amount of about 1.5 to about 30 wt. %, based on the total weight of the composition; and one or more moisture-retaining additives attached to at least a portion of a surface of the calcium hydroxide component.

13 Claims, 10 Drawing Sheets

Related U.S. Application Data continuation of application No. 19/097,707, filed on Apr. 1, 2025.

(56) References Cited

U.S. PATENT DOCUMENTS

| | | | |
|---|---|---|---|
| 2019/0351368 A1 | 11/2019 | Tate et al. | |
| 2022/0193607 A1* | 6/2022 | Specht | B01D 53/62 |
| 2022/0347651 A1 | 11/2022 | Ligner et al. | |
| 2023/0001351 A1 | 1/2023 | Goff et al. | |
| 2025/0041797 A1 | 2/2025 | Brandt et al. | |

FOREIGN PATENT DOCUMENTS

| | | |
|---|---|---|
| WO | 2022187336 A1 | 9/2022 |
| WO | 2025012458 A1 | 1/2025 |

OTHER PUBLICATIONS

Safety Data Sheet, Sorbacal SP, Jan. 27, 2020, Lhoist North America, Inc. and Lhoist North America of Canada, Inc., 8 pages.

Safety Data Sheet, Sorbacal SPS, Jan. 27, 2020, Lhoist North America, Inc. and Lhoist North America of Canada, Inc., 8 pages.

Samari Mohammad et al: "Direct capture of carbon dioxide from air via lime-based sorbents", Mitigation and Adaptation Strategies for Global Change, Springer Netherlands, Dordrecht, vol. 25, No. 1, Feb. 21, 2019 (Feb. 21, 2019), pp. 25-41, XP037126698, ISSN: 1381-2386, DOI: 10.1007/S11027-019-9845-0.

Taylor, Timothy J., et al., "Small-angle X-ray scattering of poly (acrylic acid) in solution: 1. Dioxane", Polymer vol. 37 No. 5, pp. 715-719, 1996, Elsevier Science Ltd.

Casassa, Edward F. et al., "An Equilibrium Theory for Exclusion Chromatography of Branched and Linear Polymer Chains", Mellon Institute and Department of Chemistry, Carnegie-Mellon University, Pittsburgh, Pennsylvania 15213. pp. 14-26.

* cited by examiner

HYDRATED LIME FOR CARBON CAPTURE

CROSS REFERENCE TO RELATED APPLICATION

The present application is a divisional application that claims priority to U.S. patent application Ser. No. 19/098,873, filed Apr. 2, 2025, which claims priority to U.S. patent application Ser. No. 19/097,707 filed on Apr. 1, 2025, the contents of which are incorporated herein by reference in their entirety.

TECHNICAL FIELD

This disclosure generally relates to hydrated lime compositions for carbon dioxide ($CO_2$) capture and methods for producing and/or using such compositions.

BACKGROUND

Carbon dioxide ($CO_2$) is released into the atmosphere from various human activities, including the combustion of fossil fuels, deforestation, and industrial processes.

$CO_2$ capture encompasses processes that separate and remove $CO_2$ from emission sources, such as power plants and industrial facilities, or directly from the atmosphere. Captured $CO_2$ can then be sequestered geologically or utilized in the production of other materials. Several $CO_2$ capture technologies exist, including post-combustion capture, pre-combustion capture, oxy-fuel combustion, and direct air capture (DAC). DAC specifically targets the removal of $CO_2$ directly from the atmosphere.

Unlike other carbon capture methods, which are often limited to point sources such as power plants, DAC offers the potential to address distributed emission sources, such as those from transportation e.g., cars, airplanes. This ability to capture $CO_2$ regardless of its emission source makes DAC a promising technology, especially for addressing $CO_2$ already present in the atmosphere.

One DAC technology utilizes quicklime (calcium oxide) or hydrated lime (calcium hydroxide) for $CO_2$ capture. In this process, $CO_2$ reacts with calcium oxide and/or calcium hydroxide to form calcium carbonate. This calcium carbonate can then be utilized in various ways, including, but not limited to, reuse in $CO_2$ capture (e.g., through calcination to regenerate calcium oxide), construction materials, and carbon sequestration. Lime-based DAC offers the potential for relatively low-cost and energy-efficient $CO_2$ capture.

SUMMARY

The present disclosure provides a composition for carbon capture and the composition comprises a calcium hydroxide component having a specific surface area of at least about 30 $m^2/g$; free moisture in an amount of about 1.5 to about 30 wt. %, based on the total weight of the composition; and one or more moisture-retaining additives attached to at least a portion of a surface of the calcium hydroxide component.

In some embodiments, the one or more moisture-retaining additives comprise at least one silicon compound selected from the group consisting of: a silicate, a silicate of sodium, a metasilicate of sodium, diatomaceous earth, diatomite, precipitated silica, silicic acid, silica fume, rice husk ash, amorphous silica, and any combinations thereof. In certain embodiments, a molar ratio of the silicon compound to calcium in the composition is between about 0.02 and about 0.2.

In some embodiments, the one or more moisture-retaining additives comprise at least one aluminum compound selected from the group consisting of: aluminum trihydroxide, boehmite, and any combinations thereof. In certain embodiments, a molar ratio of the aluminum compound to calcium in the composition is between about 0.02 and about 0.2.

In some embodiments, the one or more moisture-retaining additives comprise at least one polymer selected from the group consisting of: a polyacrylate, a polyacrylic acid, a crosslinked polyacrylate, a crosslinked polyacrylic acid, a crosslinked acrylamide and acrylate copolymer, a crosslinked acrylic or methacrylic acid, a crosslinked graft copolymer of polysaccharide/acrylic or methacrylic acid, a crosslinked terpolymer of acrylic acid or methacrylic acid/acrylamide/sulfonated acrylamide, guar gum, an alginate, dextran, xanthan gum, a hydroxyalkyl cellulose, a hydroxyalkyl cellulose ether, a carboxyalkyl cellulose ether, and any combinations thereof. In certain embodiments, a content of the polymer is in a range of about 0.2 to about 10 wt. %, based on the total weight of the composition.

In some embodiments, the one or more moisture-retaining additives comprise at least one hygroscopic and/or deliquescent compound selected from the group consisting of: cellulose, a salt, a humectant, and any combinations thereof. In certain embodiments, the one or more moisture-retaining additives comprise at least one salt selected from the group consisting of: zinc chloride, sodium chloride, sodium carbonate, sodium bicarbonate, sodium silicate, sodium hydroxide, calcium chloride, calcium nitrate, potassium hydroxide, potassium sulfate, lithium chloride, magnesium chloride, ferric chloride, carnallite ($KCl \cdot MgCl_2 \cdot 6H_2O$), potassium carbonate, potassium phosphate, ferric ammonium citrate, citrate salt, ammonium nitrate, and any combinations thereof. In certain embodiments, the one or more moisture-retaining additives comprise at least one humectant selected from the group consisting of: a sodium phosphate, molasses, an alpha hydroxy acid, glyceryl acetate, a glycol, a sugar, and any combinations thereof. In certain embodiments, a content of the hygroscopic and/or deliquescent compounds is in a range of about 0.05 to about 12.5 wt. %, based on the total weight of the composition.

In some embodiments, a pore volume of the calcium hydroxide component is at least about 0.13 $cm^3/g$ with pores having a diameter less than about 1000 Angstroms.

In some embodiments, the present disclosure also provides a process for direct capture of carbon dioxide in air and the process comprises providing a first composition comprising: calcium hydroxide, free moisture in an amount of about 1.5 to about 30 wt. %, based on the total weight of the composition, and one or more moisture-retaining additives attached to at least a portion of a surface of the calcium hydroxide; contacting the composition with air to capture $CO_2$ contained in the air by converting at least part of the calcium hydroxide into calcium carbonate, and forming a second composition comprising calcium carbonate.

In some embodiments, the process further comprises extracting $CO_2$ from at least a portion of the second composition. In certain embodiments, the extracting step comprises heating the calcium-carbonate-based composition to a temperature in a range of about 800-1200° C. In some embodiments, the extracting step comprises regenerating calcium oxide, and reusing the regenerated calcium oxide to capture $CO_2$.

In some embodiments, the first composition comprises a calcium hydroxide component having a specific surface area of at least about 30 $m^2/g$ and a pore volume of at least about 0.13 $cm^3/g$ with pores having a diameter less than about 1000 Angstroms.

DETAILED DESCRIPTION

Figures 1A, 1B, 1C:
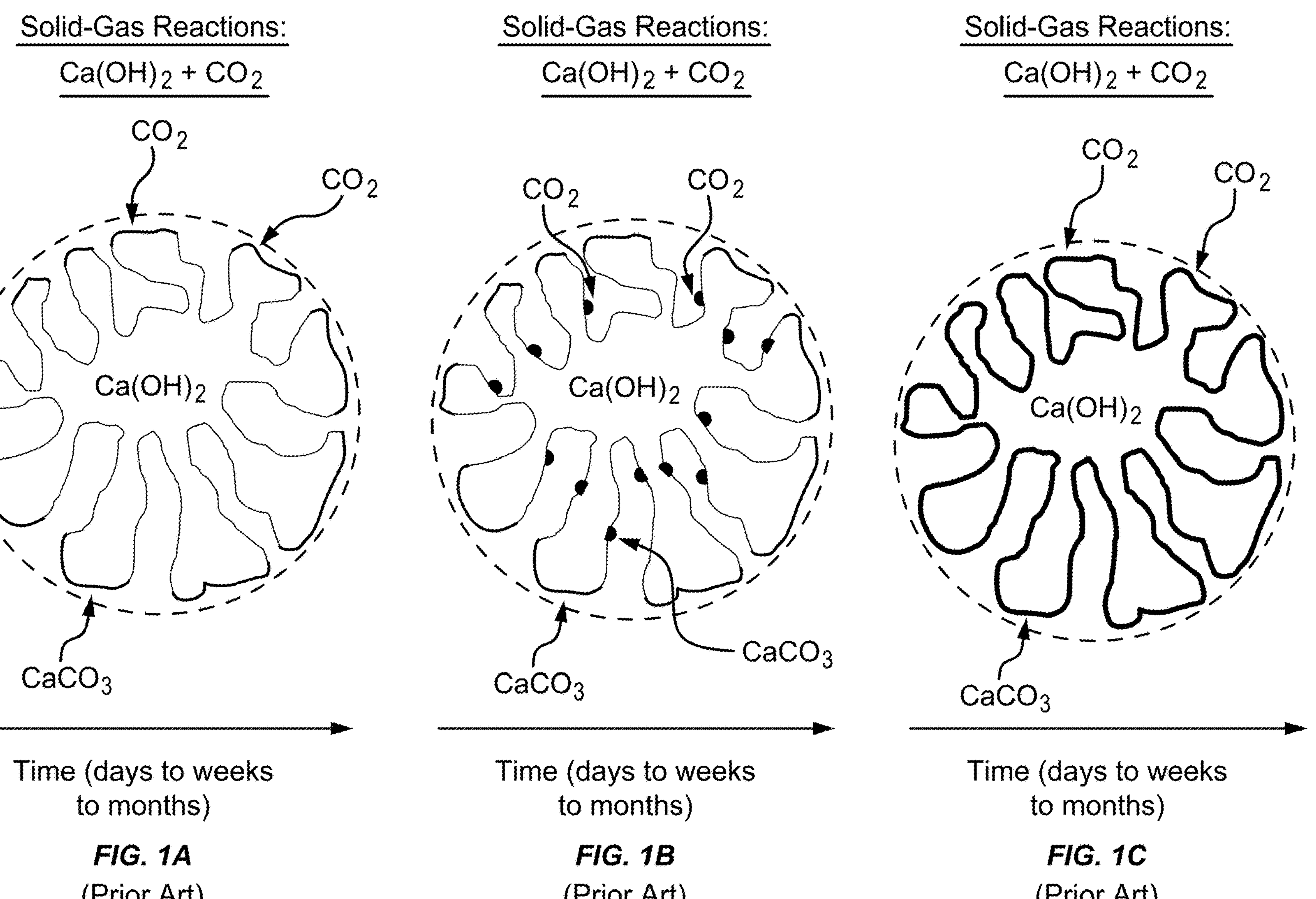
FIGS. 1A-1C illustrate the solid-gas reaction process between $Ca(OH)_2$ particles and gaseous $CO_2$.

The present disclosure relates to providing improved compositions for lime-based direct air capture (DAC) and methods for producing and/or using the same, which may enhance the efficiency, cost-effectiveness, and sustainability of DAC technology.

The terms used in this specification generally have their ordinary meanings in the art, within the context of this disclosure and in the specific context where each term is used. Certain terms are discussed below, or elsewhere in the specification, to provide additional guidance to the practitioner in describing the compositions and methods of the present disclosure and how to make and use them. The descriptions below are provided by way of example to describe some embodiments of the present disclosure and are not intended to limit the disclosure or claims in any way.

As used in the specification and the appended claims, the singular forms "a," "an" and "the" include plural referents unless the context clearly dictates otherwise. Thus, for example, reference to "a compound" includes mixtures of compounds. As another example, reference to "a composite" includes mixtures of composites.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of," and "consisting essentially of," the embodiments or elements presented herein, whether explicitly set forth or not.

As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. Ranges disclosed herein, for example, "between about X and about Y" are, unless specified otherwise, inclusive of range limits about X and about Y as well as X and Y. With respect to sub-ranges, "nested sub-ranges" that extend from either endpoint of the range are specifically contemplated. For example, a nested sub-range of an exemplary range of 1 to 50 can include 1 to 10, 1 to 20, 1 to 30, and 1 to 40 in one direction, or 50 to 40, 50 to 30, 50 to 20, and 50 to 10 in the other direction. Ranges disclosed herein, for example, "between about X and about Y" are, unless specified otherwise, inclusive of range limits about X and about Y as well as X and Y.

In the detailed description herein, references to "embodiment," "an embodiment," "one embodiment," "in various embodiments", "certain embodiments", "some embodiments", etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The terms "weight percent" or "wt. %" or "by weight" or "w/w" may refer to either (i) the quantity by weight of a constituent/component in a composition as a percentage of the total weight of the composition; or (ii) the quantity by weight of a constituent/component in the material as a percentage of the weight of the final material or product.

The particular type of "lime" used in the practice of the present invention is of importance and a brief summary of the general types of lime may be helpful to understanding the important differences. The general types of lime available in the marketplace include:

Limestone (calcium carbonate-$CaCO_3$ with impurities) is present in large quantities in natural rock around the world.

Quicklime (calcium oxide-CaO with impurities) is an alkali and the result of the chemical transformation of limestone by heating it typically above 900° C. Given its rapid reaction with water, calcium oxide, also called burnt lime, is often referred to as quicklime.

Hydrated lime or Slaked lime [calcium (di-)hydroxide-$Ca(OH)_2$ with impurities] is a strong alkali formed when calcium oxide reacts with water. This reaction generates heat. Depending on the amount of water used, calcium hydroxide can either be a dry hydrate (dry powder), a paste (putty lime) or a liquid milk of lime also called lime slurry (dry suspension in water).

High Calcium Hydrate or hydrated calcium lime-hydrated lime containing mainly calcium hydroxide thus containing a low amount of magnesium compound as impurity, i.e., when expressing magnesium as MgO, having less than 5% MgO typically a MgO content lower than 3%, in particular lower than 2% in weight.

Dolomite (double carbonate of calcium and magnesium-$CaCO_3 \cdot MgCO_3$) is the result of a partial or full dolomitization of calcium carbonate.

Dolime or dolomitic lime, as defined above, (calcium & magnesium oxide-CaO·MgO) is the result of the chemical transformation of double carbonate of calcium and magnesium by heating it typically above 900° C.

Hydrated dolime (calcium & magnesium (tetra-) hydroxide-$Ca(OH)_2 \cdot Mg(OH)_2$) represents the completion of the hydration reaction carried out in pressurized reactors at temperatures of around 150° C.

Semi- or partially hydrated dolime ($Ca(OH)_2 \cdot MgO$) is an intermediate product between dolime and hydrated dolime, where a part of the magnesium oxide MgO is not converted in magnesium hydroxide during hydration.

Partially dolomitic lime/hydrated lime—these typically include about >3% MgO (w/w) up to a theoretical maximum of about 41.8% (w/w) MgO. As the hydroxide, this range can be from about 3% (w/w) $Mg(OH)_2$ to a theoretical maximum of about 44% (w/w) as $Mg(OH)_2$. These are produced either by partially dolomitized lime or by blending high calcium lime (CaO) or hydrated lime ($Ca(OH)_2$) with dolomitic lime (CaO·MgO) or dolomitic hydrated lime ($Ca(OH)_2 \cdot Mg(OH)_2$).

The term "free moisture" may refer to water content in a solid material that is not chemically bound to the solid and can be removed by evaporation or mechanical means, such as drying. This may include various forms of water, e.g., interstitial water, structural water, and surface-bound water. The free moisture content may be measured using ASTM C25, which involves heating lime samples to 120° C. on a moisture balance and measuring the weight loss.

In lime-based DAC, $CO_2$ capture can occur through reactions with either quicklime (CaO) or hydrated lime ($Ca(OH)_2$):

$$CaO\ (s) + CO_2\ (g) \rightarrow CaCO_3\ (s) \quad \text{Equation 1}$$

$$Ca(OH)_2\ (s) + CO_2\ (g) \rightarrow CaCO_3\ (s) + H_2O\ (l) \quad \text{Equation 2}$$

The resulting calcium carbonate ($CaCO_3$) can then be calcined to regenerate CaO and release $CO_2$:

$$CaCO_3\ (s) \rightarrow CaO\ (s) + CO_2\ (g) \quad \text{Equation 3}$$

The calcination process requires heat, which may be supplied electrically, by traditional methods such as fuel combustion, or by renewable energy sources. Using industrial oxygen instead of air offers the advantage of avoiding nitrogen dilution of the released $CO_2$, simplifying downstream processing.

Following purification, the $CO_2$ released from calcium carbonate decomposition (Equation 3) and from fuel combustion can be sequestered, achieving net $CO_2$ removal from the atmosphere. The regenerated quicklime (CaO) or hydrated lime ($Ca(OH)_2$) can then be cyclically reused for subsequent $CO_2$ capture.

Lime-based DAC faces challenges related to reaction kinetics and mass transfer limitations. The process can be slow and inefficient due to the slow diffusion of $CO_2$ into the internal pore structure of the lime particles. This mass transfer resistance limits the reaction rate and extent of carbonation on practical time scales. Initially, $CO_2$ reacts with readily available calcium ions ($Ca^{2+}$) on the particle surface, representing only a small fraction (typically <10%) of the total available $Ca^{2+}$ ions. Once these surface $Ca^{2+}$ ions are depleted, further $CO_2$ capture requires diffusion into the lime pores to react with the remaining $Ca^{2+}$ ions. Diffusion processes in these solid-gas reactions are inherently slow. Furthermore, the formation of a calcium carbonate layer on the lime surface can further impede $CO_2$ capture, limiting the complete utilization of the lime (e.g. pore blockage).

While moisture can enhance the reaction rate of $CO_2$ with $Ca(OH)_2$/CaO, traditional methods of increasing air humidity to improve $CO_2$ capture efficiency face practical and economic challenges. Ambient air (e.g., 25° C., 1 atm) has a limited moisture-carrying capacity. Even at 100% relative humidity (RH), the water content is relatively low (e.g., 0.0016 lbs water per cubic foot of air at 25° C.). Therefore, achieving significant humidity increases can require substantial energy input and complex equipment. Additionally, humidifying air to 100% RH may increase condensation within the equipment, potentially leading to particle deposition, dust caking, and corrosion.

Hydrated lime ($Ca(OH)_2$), typical containing 1%-1.4% (w/w) free moisture, offers certain advantages over quicklime (CaO) due to its microstructural properties, which can facilitate faster and more complete conversion to calcium carbonate. Relative humidity can also influence carbonation, as the reaction proceeds via a dissolution-precipitation mechanism. In addition, a more porous structure also can facilitate $CO_2$ capture as more porous structures typically have higher surface areas. However, even with porous $Ca(OH)_2$, the $CO_2$ capture process can be slow and inefficient due to limitations in reaction kinetics and mass transfer.

FIGS. 1A-1C illustrate the solid-gas reaction process between porous $Ca(OH)_2$ particles and gaseous $CO_2$. As shown in FIG. 1A, initial $CO_2$ reaction readily occurs with surface $Ca^{2+}$ ions, forming $CaCO_3$ on the surface of the $Ca(OH)_2$ particle. Subsequent reaction is then limited by $CO_2$ diffusion through the formed $CaCO_3$ layer and into the particle's internal pore structure (FIG. 1B).

This diffusion process is inherently slower than the chemical reaction kinetics, creating a bottleneck in the overall reaction rate. As $CaCO_3$ forms within the internal pores, it blocks access to the remaining $Ca^{2+}$ ions, further hindering the reaction (FIG. 1C). This mass transfer resistance leads to slow reaction rates and incomplete carbonation, often achieving less than 80% conversion of $Ca(OH)_2$ to $CaCO_3$ even after several days or weeks. FIGS. 2A-2D illustrate a solid-liquid-gas reaction between highly hydrated lime particles and gaseous $CO_2$. In certain non-limiting embodiments, the highly hydrated lime may have a free moisture content between about 1.5% and about 30% (w/w). In some embodiments, the highly hydrated lime has a free moisture content between about 1.5% and about 5% (w/w), between about 1.5% and about 10% (w/w), between about 1.5% and about 20% (w/w), between about 3% and about 10% (w/w), or between about 5% and about 30% (w/w). In certain non-limiting embodiments, the highly hydrated lime may be represented by the formula $[Ca(OH)_2]_{1-x}[CaCO_3]_x \cdot yH_2O$, where x ranges from about 0.5 to about 0.95 and y is greater than or equal to about 0.0617, based on molar quantities. For simplicity, the terms "highly hydrated lime" and "hydrated $Ca(OH)_2$" may be used interchangeably below.

By way of example but not limitation, the highly hydrate lime particle may be porous. In some embodiments, the highly hydrated lime has a median particle size of less than about 15 μm, a specific surface area of at least about 30 $m^2/g$, and a total pore volume of at least about 0.13 $cm^3/g$. In some specific embodiments, the total pore volume is comprised by pores with a diameter less than about 1000 Angstroms.

Figure 2A:
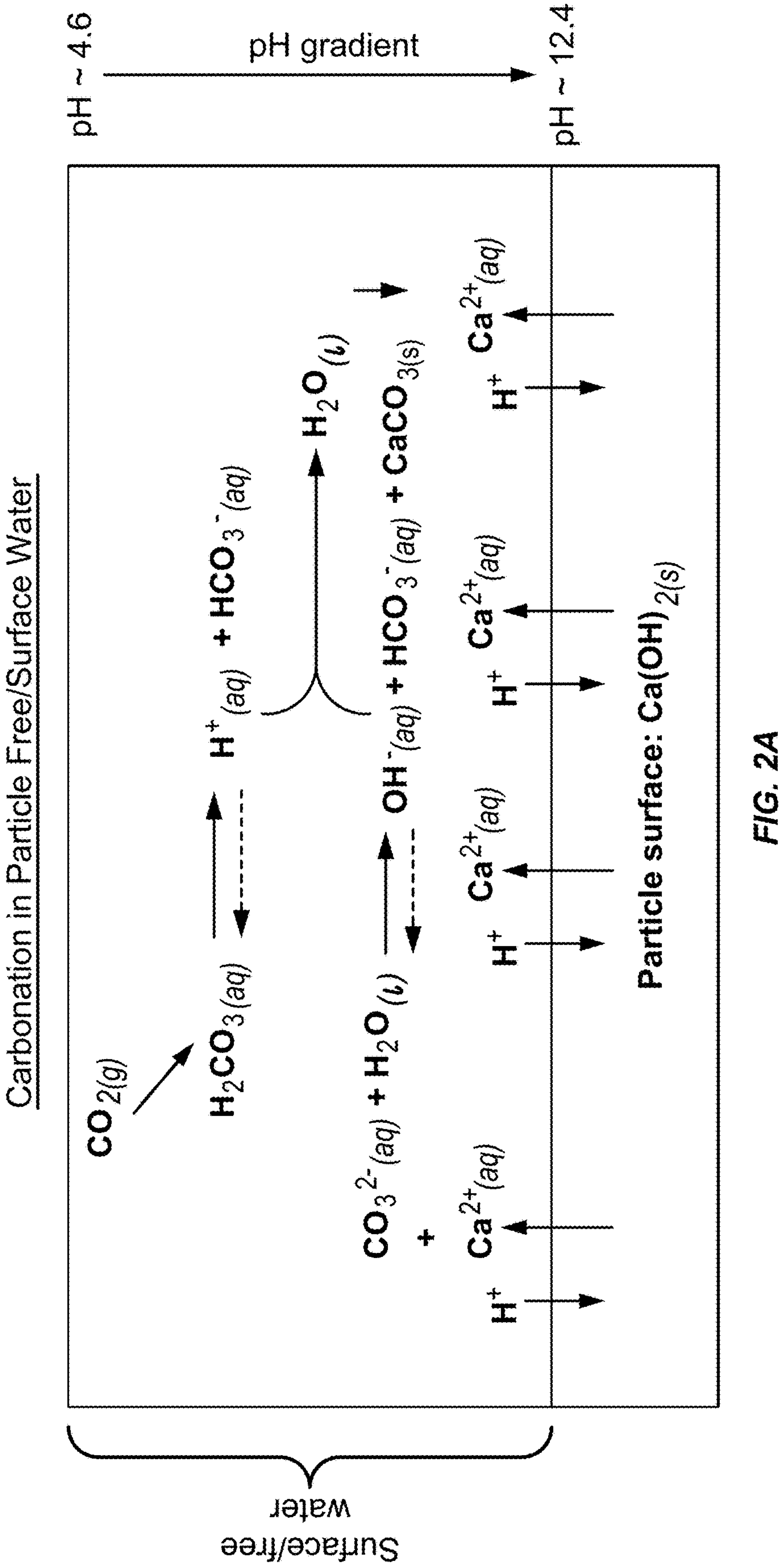
FIGS. 2A-2D illustrate the solid-liquid-gas reaction for reaction between highly hydrated $Ca(OH)_2$ particles and gaseous $CO_2$.
Figures 2B, 2C, 2D:
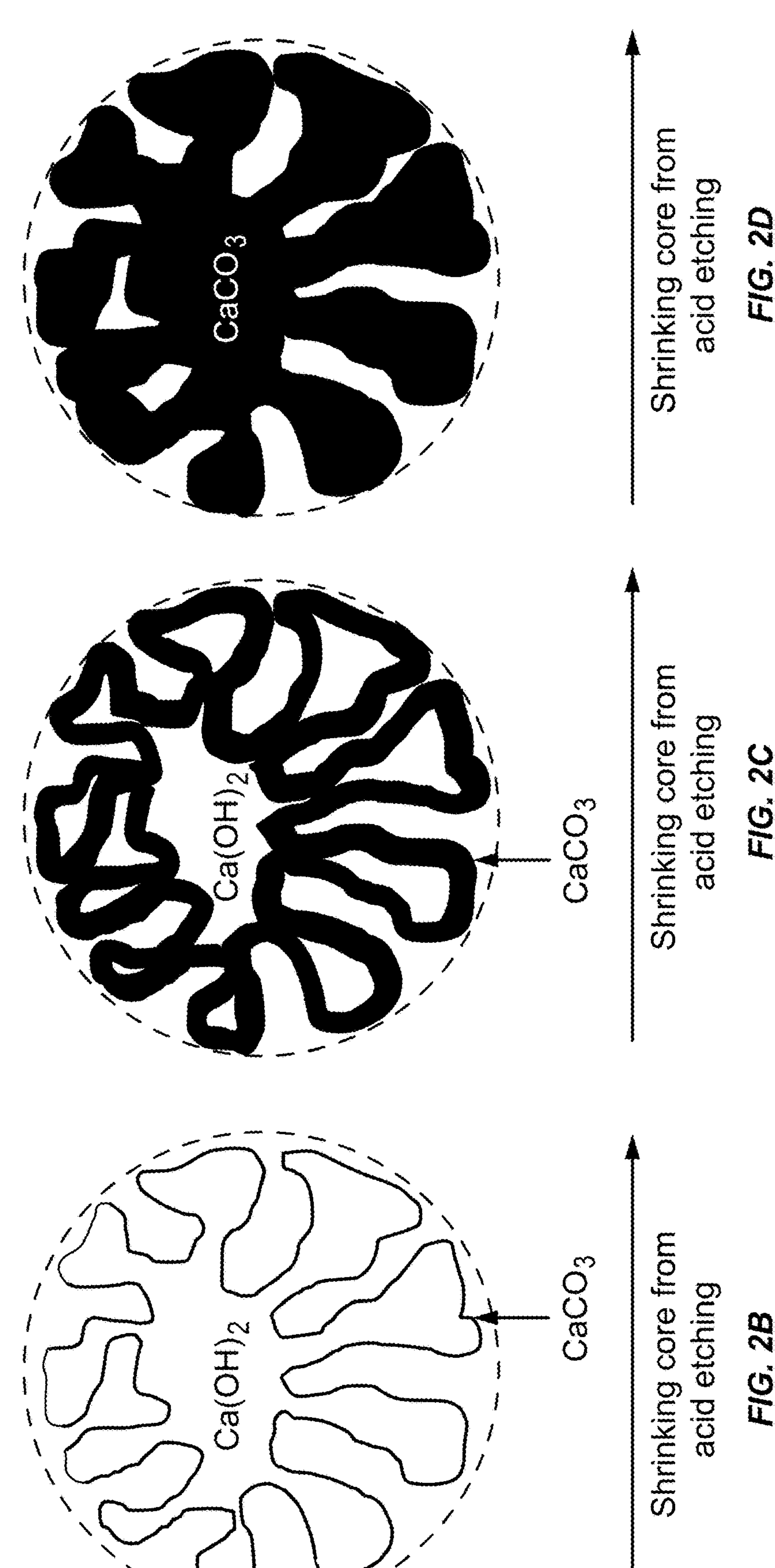

In some embodiments, the high free moisture content forms a liquid layer on the porous particle surface. As shown in FIG. 2A, gaseous $CO_2$ may first dissolve in this moisture layer, forming carbonic acid ($H_2CO_3$). This carbonic acid dissociates into bicarbonate ions ($HCO_3$) and hydrogen ions ($H^+$), lowering the pH of the water. In some embodiments, the pH of this acidic layer is between about 4 and about 6 at 25° C. In some embodiments, the pH of this acidic layer is approximately 4.6 at 25° C. Simultaneously, at the inner surface of the moisture layer, $Ca(OH)_2$ dissolves, creating an alkaline environment with a pH typically below about 12.45 at 25° C. The dissolved $Ca^{2+}$ ions react with the dissolved carbonate ions near the $Ca(OH)_2$ surface, leading to the precipitation of $CaCO_3$ (FIG. 2B). This process generates water, further promoting $CO_2$ dissolution and maintaining a substantially continuous reaction. The substantially continuous dissolution and acidification may also etch the $Ca(OH)_2$ surface, exposing fresh $Ca^{2+}$ ions for reaction (FIG. 2C). This process may continue until the entire particle is complete or substantially completely converted to $CaCO_3$ (FIG. 2D).

The rates of these solid-liquid-gas reactions may be significantly faster than solid-gas reactions due at least in part to the reduction of mass transfer limitations. The dissolved carbonate ions in the water layer may reduce the need for $CO_2$ to diffuse to the $Ca^{2+}$ ions, facilitating faster reaction. In some embodiments, the solid-liquid-gas reaction process may facilitate complete or substantially complete conversion of $Ca(OH)_2$ to $CaCO_3$ within hours to days, depending on reaction conditions such as temperature, pressure, and humidity, etc.

In certain embodiments, moisture-retaining additives may be incorporated, among other reasons, to retain moisture on or near the $Ca(OH)_2$ particle surface and improve hydration even under dry conditions and/or high temperatures. Such moisture-retaining additives may include one or more of any of the compounds and polymers discussed below, as well as other moisture-retaining additives that a person of skill in the art will recognize with the benefit of the present disclosure. In some particular embodiments, these moisture-retaining additives may be selected to avoid impeding the flowability of the particles within the DAC equipment, ensuring smooth operation and preventing clogging. In some embodiments, these moisture-retaining additives may be selected to enhance chemical kinetics of the carbonation reaction, leading to faster and more efficient $CO_2$ capture. These moisture-retaining additives may be attached to the $Ca(OH)_2$ particle surface through chemical bonds, physical interactions, or precipitation. Further details regarding additive attachment are provided at step S306 in FIG. 3 below.

In certain embodiments, silicon compounds and/or aluminum compounds may be attached to the $Ca(OH)_2$ particle surface. Examples of silicon compounds include silicates, silicates of sodium, metasilicates of sodium, kieselguhr, i.e., diatomaceous earth, diatomite, precipitated silica, silicic acid, silica fume, rice husk ash, amorphous silica, and any combinations thereof. Examples of aluminum compounds include aluminum trihydroxide, boehmite, and any combinations thereof. Additionally, compounds containing both silicon and aluminum, such as vermiculite and paper ash, may be utilized. Further details regarding the silicon and aluminum compound additives can be found in U.S. Pat. No. 11,331,646 B2, filed on Apr. 6, 2018, the relevant disclosures of which are herein incorporated by reference. In certain embodiments, the content of these silicon and/or aluminum compounds, either before or during the slaking process, may be controlled such that the molar ratio of silicon and/or aluminum to calcium is between about 0.02 and about 0.2.

In certain embodiments, polymers, particularly hydrogel-forming polymers, may be attached to the $Ca(OH)_2$ particle surface. Examples of suitable polymers include superabsorbent polymers such as polyacrylates, polyacrylic acids, crosslinked polyacrylates and polyacrylic acids, and crosslinked acrylamide and acrylate copolymers, particularly those partially neutralized with sodium and/or potassium. Examples of superabsorbent polymers include, but not limited to, crosslinked polymers of acrylic or methacrylic acid, crosslinked graft copolymers of polysaccharide/acrylic or methacrylic acid, and crosslinked terpolymers of acrylic acid or methacrylic acid/acrylamide/sulfonated acrylamide, along with their alkaline earth or alkaline metal salts. Natural hydrogels like guar gum, alginates, dextran, and xanthan gum may also be used. Additionally, cellulose ethers, including hydroxyalkyl cellulose, hydroxyalkyl or carboxyalkyl cellulose ethers such as carboxymethyl cellulose and hydroxyethyl methyl cellulose (HEMC), may be used. Further details regarding the polymer additives can be found in U.S. Patent Publication No. US 2022/0347651 A1, filed on Sep. 22, 2020, the relevant disclosure of which is hereby incorporated by reference. The content of the polymers may range from 0.2% (w/w) to 10% (w/w).

In some embodiments, hygroscopic and deliquescent compounds can also be attached to the $Ca(OH)_2$ particle surface. These compounds may increase the vaporization or boiling temperature of water bound on the surface of $Ca(OH)_2$ or CaO, aiding moisture retention at temperatures above 100° C. They can also decrease water vapor pressure, reducing evaporation under dry ambient conditions (RH<60%). In some embodiments, when combined with silicon compounds, aluminum compounds, and/or polymers, these deliquescent and hygroscopic compounds may enhance the ability of the highly hydrated lime particles to retain surface moisture for extended periods, at higher temperatures, and under lower relative humidity, promoting $CO_2$ capture.

In some specific embodiments, suitable hygroscopic and deliquescent compounds include, but not limited to, cellulose, salts, and/or humectants. By way of example but not limitation, suitable salts may include zinc chloride, sodium chloride, sodium carbonate, sodium bicarbonate, trona, sodium silicate, sodium hydroxide, calcium chloride, calcium nitrate, potassium hydroxide, potassium sulfate, lithium chloride, magnesium chloride, ferric chloride, carnallite ($KCl \cdot MgCl_2 \cdot 6H_2O$), potassium carbonate, potassium phosphate, ferric ammonium citrate, citrate salt, ammonium nitrate, and any combinations thereof. By way of example but not limitation, suitable humectant materials may include sodium phosphates, molasses, alpha hydroxy acids, glyceryl acetate, glycols (ethylene glycol, propylene glycol, diethylene glycol, sugars, and any combinations thereof. The content of these hygroscopic and deliquescent compounds may range from about 0.05% to about 12.5% (w/w), or more specifically, between about 0.25% and about 10% (w/w), or between about 0.4% and about 8% (w/w).

Figure 3:
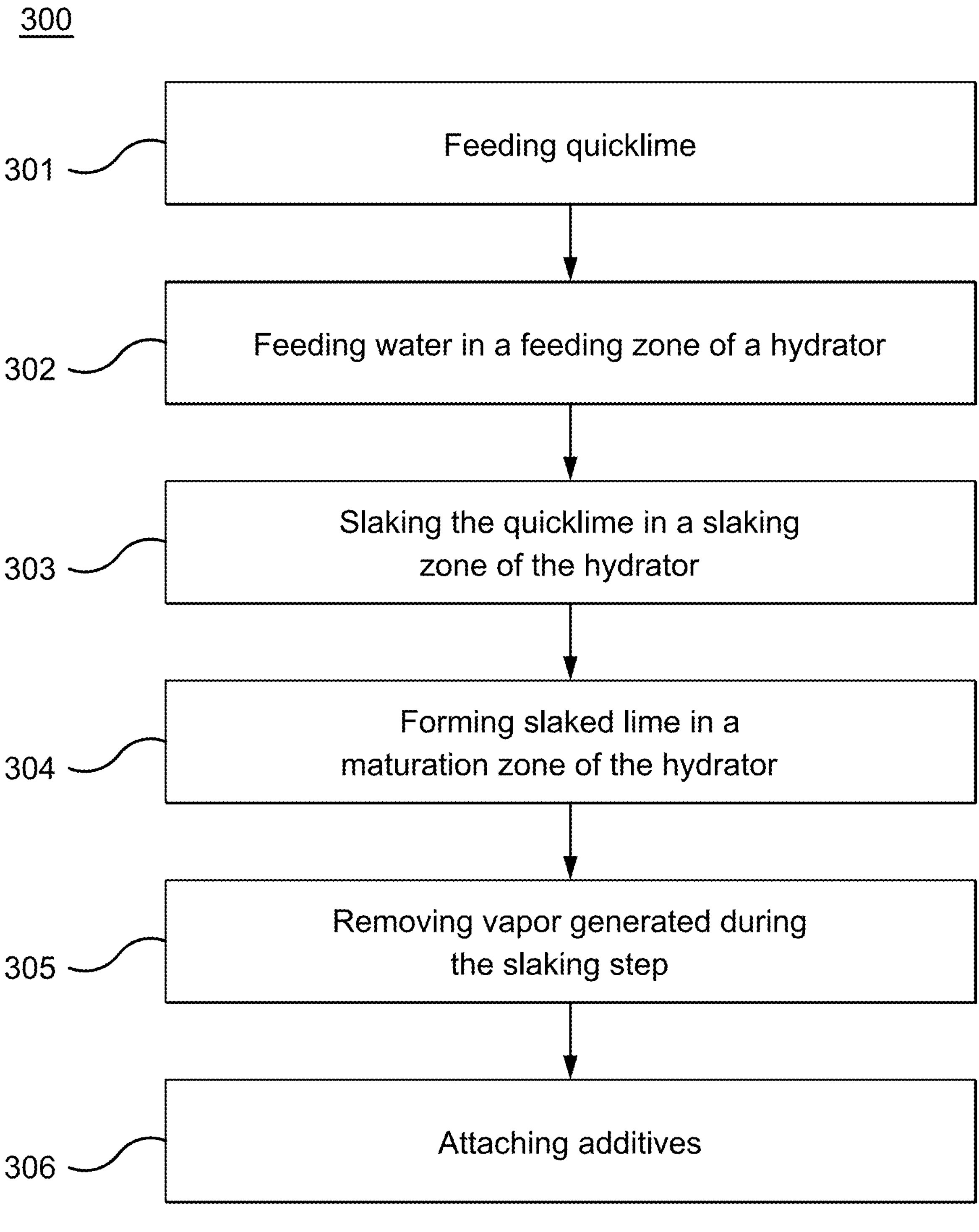
FIG. 3 provides an exemplary method for producing the highly hydrated lime.

In some embodiments, a method of producing the highly hydrated lime is provided. A variety of processes can be used to provide the highly hydrated lime of the present disclosure. An exemplary method is illustrated in FIG. 3. Further details regarding methods for producing the hydrated lime particles can be found in U.S. Pat. No. 10,669,199 B2, filed on Aug. 12, 2016, the relevant disclosure of which is hereby incorporated by reference.

In certain non-limiting embodiments, the produced lime has a porous structure, median particle size (less than about 15 μm), high specific surface area (at least about 30 $m^2/g$), and high pore volume (at least about 0.13 $cm^3/g$), particularly with pores smaller than about 1000 Angstroms in diameter.

Method 300 utilizes either a single stage hydrator or a hydrator that can be divided into consecutive zones: feeding zone, slaking zone, and maturation/finishing zone.

Feeding Zone: Quicklime (CaO) and water are introduced and mixed (steps 301 and 302).

Various mixing methods can be employed to ensure a homogeneous mixture, including shearing, tumbling, and mechanical agitation (e.g., using impellers, screws, or fluidized bed reactors).

As discussed above, quicklime may refer to a mineral primarily composed of calcium oxide (CaO), is typically produced by calcining limestone ($CaCO_3$). In some embodiments, quicklime may contain impurities, such as magnesium oxide, (MgO), sulfur oxide ($SO_3$), silica ($SiO_2$) or alumina ($Al_2O_3$), etc. In some embodiments, the impurities may appear under different phases. Other than their oxide forms. Quicklime may also contain residual limestone, called unburned residues.

In some embodiments, the MgO content may be in the range of about 0.5 to about 10 wt. %, preferably equal to or lower than about 5 wt. %, more preferably equal to or lower than about 3 wt. %, most preferably equal to or lower than about 1 wt. %, with respect to the total weight of the quicklime. In some embodiments, the $SO_3$ content is equal to or lower than about 1 wt. %, preferably equal to or lower than about 0.5 wt. %, more preferably equal to or lower than about 0.2 wt. %, with respect to the weight of quicklime.

In some embodiments, the quicklime may comprise residual $CO_2$ from unburned limestone. In certain embodiments, the $CO_2$ content of the quicklime is preferably equal to or lower than about 5 wt. %, preferably equal to or lower than about 3 wt. %, more preferably equal to or lower than about 1 wt. % with respect to the weight of quicklime.

Slaking Zone: The slaking reaction primarily occurs in this zone, where quicklime is provided in presence of water. Calcium oxide from the quicklime reacts quickly with water to form calcium hydroxide $Ca(OH)_2$, under the form of slaked lime or hydrated lime (step 303). The process generates significant heat and vapor.

The slaked lime therefore may contain the same impurities than the quicklime from which it is produced. The slaked lime may also comprise calcium oxide, which might not have been entirely hydrated during the slaking step, or calcium carbonate $CaCO_3$. The calcium carbonate may be originated from the original limestone (unburned) from which said slaked lime is obtained (via calcium oxide) or being the result of a partial carbonation reaction of slaked lime through the contact with an atmosphere containing $CO_2$.

The content of calcium oxide in the slaked lime may equal to or lower than about 3 wt. %, preferably equal to or lower than 2 wt. % and more preferably equal to or lower than about 1 wt. %, with respect to the total weight of the slaked lime. The content of $CO_2$ in slaked lime (mainly in the form of $CaCO_3$) may equal to or lower than about 4.5 wt. %, preferably equal to or lower than about 3 wt. %, more preferably equal to or lower than about 2 wt. %, with respect to the total weight of the slaked lime according to the present invention.

The resulting slaked lime typically has a water-to-quicklime ratio between 0.8 and 1.5 by weight, preferably between 0.9 and 1.3, and ideally close to 1.

Maturation/Finishing Zone: This zone ensures complete slaking and homogenization of residual moisture within the $Ca(OH)_2$ (step 304).

Method 300 may optionally include vapor removal (step 305), primarily along the slaking zone. This vapor removal may contribute to the formation of highly porous $Ca(OH)_2$ with a high specific surface area and pore volume. In some embodiments, the obtained lime has a free moisture content between 1.5% and 30% (w/w). While traditional calcium hydroxide production generally involves a slaking process, it does not typically include a drying step, as the resulting product already possesses a relatively low free moisture content. However, some specific processes, such as the Sorbacal® SP and SPS processes, incorporate drying steps after slaking to achieve a lower free moisture content (e.g., 0.5-1.4% (w/w)). The novelty of these prior art processes resided, at least in part, in this overhydration followed by a subsequent drying step to achieve specific product characteristics. In contrast, the current method leverages the high free moisture content, by employing no drying. However, partial drying may be optionally introduced after 305 if necessary.

An optional step (306) can be included to attach moisture-retaining additives (e.g., including but not limited to the additives discussed above) to the highly hydrated lime particles, inter alia, to enhance water retention, maintain flowability, and/or enhance chemical kinetics. In some embodiments, these additives can be attached through various mechanisms, including but not limited to:

Chemical bonding: Additives can form covalent or ionic bonds with the $Ca(OH)_2$ surface. This can be achieved by using additives with functional groups that react with calcium hydroxide.

Surface complexation: Additives can form surface complexes with the lime through coordination bonds or electrostatic interactions. This can be achieved by using additives with ligands or charged groups that can interact with calcium ions on the lime surface.

Precipitation: Additives can be precipitated onto the lime surface from a solution by mixing the lime with an additive-containing solution and adjusting conditions like pH to induce precipitation.

In some embodiments, additives can be attached through physical interactions, including but not limited to:

Van der Waals forces: These weak intermolecular forces can attract additive molecules to the lime surface.

Physical entrapment: Additives can be physically entrapped within the pores or surface irregularities of the lime particles by mixing the additive with the lime during or after slaking.

Coating: Additives can be applied as a coating on the lime particles through methods like spraying, dipping, or fluidized bed coating. The coating can be a solid, liquid, or a combination of both.

In some embodiments, the produced highly hydrated lime particles from step 305 and/306 may be shaped into shaped bodies. By way of example but not limitation, the shaped bodies may include pellets, tablets, granules, extrudates, 3D printings, or briquettes. In some embodiments, the shaped bodies may be produced by suitable methods including, but not limited to, pressing, extrusion, briquetting, granulation, or 3D printing.

In some embodiments, this disclosure provides methods and processes for using highly hydrated lime in carbon capture. In some embodiments, the process involves direct capture of carbon dioxide from air. This process may include the following steps:

1. Providing a composition comprising calcium hydroxide: this composition may comprise a calcium hydroxide component with a specific surface area of at least about 30 $m^2/g$ and a pore volume of at least about 0.13 $cm^3/g$, with pores having a diameter less than about 1000 Angstroms. The composition also contains free moisture in an amount of about 1.5 to about 30 wt. %, based on the total weight of the composition. This high moisture content may promote rapid and efficient $CO_2$ capture.
2. Contacting the composition with air: The composition is contacted with air, allowing the $CO_2$ in the air to react with the calcium hydroxide. This reaction converts the calcium hydroxide into calcium carbonate, effectively capturing the $CO_2$. To improve $CO_2$ capture efficiency, various methods can be employed to enhance the contact between the $CO_2$ and the calcium hydroxide-based composition. These methods may include, but are not limited to:

Fixed bed reactors: These reactors involve passing the air stream through a stationary bed of calcium hydroxide-based composition. This provides a relatively simple design for contacting the gas and solid phases.

Fluidized bed reactors: These reactors use a stream of gas to suspend and mix the solid lime particles, creating a large surface area for $CO_2$ contact and promoting efficient mass transfer.

Porous support: The calcium hydroxide-based composition can be coated onto porous supports, such as membranes or filters, which increase the surface area available for $CO_2$ adsorption.

Controlling the gas flow rate and direction: Optimizing the gas flow rate and direction can ensure adequate contact time and efficient mixing between the $CO_2$ and the lime particles.

Controlling the humidity and temperature: Controlling the temperature and humidity of the air stream may impact the efficiency of $CO_2$ capture. The temperature is generally controlled in the range from about 10° C. to about 100° C., and the relative humidity levels are controlled in the range from about 10% to about 95%. Maintaining optimal temperature and humidity levels can enhance $CO_2$ adsorption rates and overall capture capacity.

3. Collecting the calcium carbonate-based composition: The resulting calcium carbonate-based composition, which now contains the captured $CO_2$, is collected for further processing. The collection may be achieved through various methods, including but not limited to:

Filtration: Separating the solid calcium carbonate from the gas stream using filters or membranes.

Cyclonic separation: Utilizing centrifugal forces to separate the calcium carbonate particles from the gas stream.

Gravity settling: Allowing the calcium carbonate particles to settle out of the gas stream due to gravity.

4. Extracting $CO_2$ and regenerating calcium hydroxide: The captured $CO_2$ is extracted from the calcium carbonate-based composition. This can be achieved through various methods, such as heating the calcium carbonate to release $CO_2$ or reacting it with an acid. In some embodiments, the calcium carbonate-based composition is heated to a temperature in the range of 800-1200° C. to extract at least a portion of the captured $CO_2$. This calcination step also regenerates calcium oxide (CaO), which can then be hydrated to form calcium hydroxide ($Ca(OH)_2$) and reused in the $CO_2$ capture process, thus forming a Calcium Looping (Ca-looping) cycle.
5. Reusing calcium hydroxide: The regenerated calcium hydroxide is reused in step 1, continuing the Calcium Looping (Ca-looping) cycle for further $CO_2$ capture.

The use of highly hydrated lime with enhanced moisture content may allow for efficient $CO_2$ capture even at low $CO_2$ concentrations, making it suitable for capturing $CO_2$ directly from ambient air.

EXAMPLES

The following examples are merely illustrative of the presently disclosed subject matter and they should not be considered as limiting the scope of the subject matter in any way.

Evaluation of Lime Samples Carbonation Rates

Figure 4C:
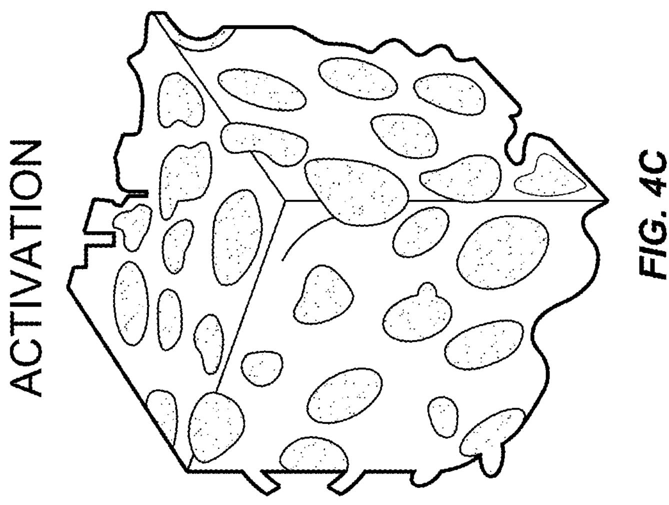
FIGS. 4A-4C illustrate the structures of standard grade hydrated lime, porous hydrated lime, and chemically enhanced porous hydrated lime particles, respectively.
Figure 4B:
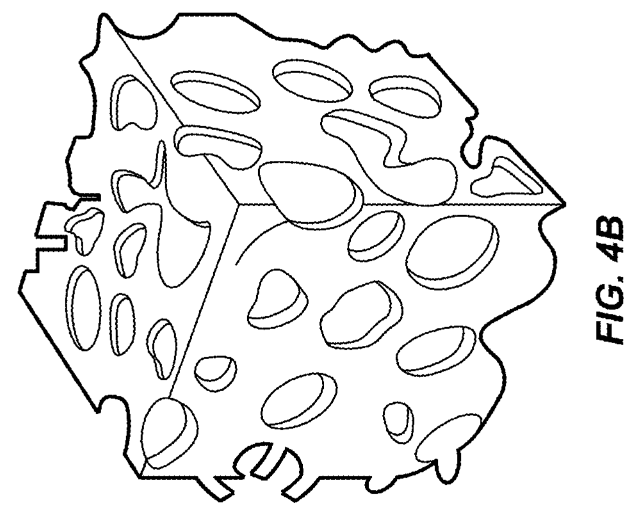
Figure 4A:
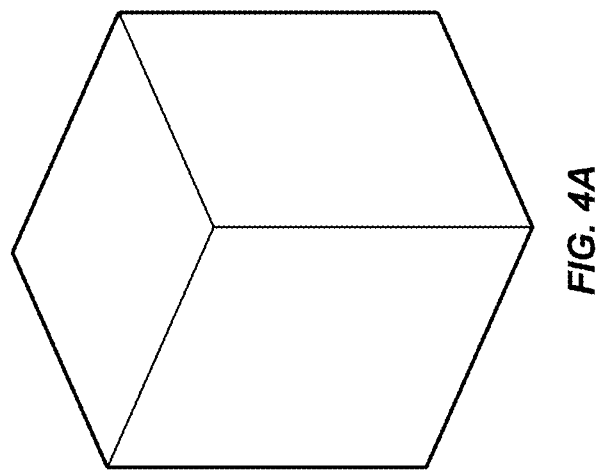

The carbonation rates of various lime samples were evaluated under various conditions, as described below. FIGS. 4A-4C and Table 1 illustrate the structures and parameters of these samples:

TABLE 1

Parameters of hydrated lime samples.

| Sample | Specific surface area (SSA) ($m^2/g$) | Pore volume (PV) ($cm^3/g$) | Typical $D_{50}$ (μm) | Free moisture content (wt. %) |
|---|---|---|---|---|
| Standard grade hydrated lime | 14-18 | ~0.07-0.1 | 5-7 | <1-1.5 |
| Porous hydrated lime | 40-45 | ≥0.20 | 10-15 | <1-1.5 |
| Chemically enhanced porous hydrated lime | 36-42 | ≥0.16 | 10-15 | <1-1.5 |
| High free moisture porous hydrated lime | 40-45 | ≥0.20 | 10-15 | >1.5 |

1. Standard Grade Hydrated Lime (HL):

Commercially available standard grade hydrated lime (HL) primarily consists of $Ca(OH)_2$. It typically has a specific surface area (SSA) of 14-18 $m^2/g$, a pore volume of approximately 0.07-0.1 $cm^3/g$, and a typical particle size (D50) of 5-7 μm (FIG. 4A). It is produced through a standard slaking process, which includes a drying step to reduce the free moisture content to <1-1.5 wt. %. HL is commercially available from Lhoist (headquartered in Belgium).

2. Porous Hydrated Lime (PHL):

Commercially available porous hydrated lime (PHL) is an enhanced hydrated lime compared to HL, with a higher SSA of 40-45 $m^2/g$ and a larger PV of ≥0.20 $cm^3/g$, resulting in a more porous structure. Its typical D50 is 10-15 μm (FIG. 4B). The production of PHL also includes a drying step to achieve a free moisture content of <1-1.5 wt. %. PHL is commercially available from Lhoist (headquartered in Belgium).

3. Chemically Enhanced Porous Hydrated Lime (C-PHL):

Commercially available chemically enhanced porous hydrated lime (C-PHL) is a chemically enhanced version of PHL. It typically has an SSA of 36-42 $m^2/g$, a PV of >0.16 $cm^3/g$, and a D50 of 10-15 μm. C-PHL undergoes a similar drying process. C-PHL is commercially available from Lhoist (headquartered in Belgium).

4. High Free Moisture Porous Hydrated Lime (High Free Moisture PHL)

High free moisture porous hydrated lime (high free moisture PHL) is produced in a manner similar to the PHL but without the drying step, or with only partial drying. This results in a higher free moisture content (>1.5 wt. %) compared to the other samples.

Table 2 illustrates the carbonation testing conditions for the various lime samples.

TABLE 2

Carbonation testing conditions.

| Analysis condition | Temperature (° C.) | Humidity (%) |
|---|---|---|
| Benchtop | 20.6-21.7 | 11.5-38.5 |
| Furnace | 90 | Not measured |
| Humidity cabinet | 19.4-21.1 | 79.5-98.5 |

To quantify carbonation rates, each sample from each testing condition was analyzed for loss on ignition (LOI) at 600° C. and 1000° C. at specific time intervals, for example, 8, 24, 48, 72, 96, and 168 hours. The entire sample was used for LOI testing to ensure consistency.

Loss on Ignition (LOI) Testing:

The LOI test involves a three-step process:

Moisture Analysis: The sample is heated to 180° C. and held at that temperature until a stable weight is achieved. This step determines the moisture content of the sample.

Organic Matter and Hydroxyl Group Removal: The temperature is then increased to 600° C. and held constant until the weight stabilizes. This step removes any organic matter and hydroxyl groups present in the sample.

Carbonate Decomposition: Finally, the temperature is raised to 1000° C. and held until the weight stabilizes. This step decomposes the carbonates in the sample, allowing for the determination of the carbonate content.

Carbonation Rate Calculation:

The LOI values at 600° C. and 1000° C. were used to calculate the percent carbonation using the following equation:

$$(LOI_{1000} - LOI_{600}) \times \frac{(100 \text{ g/mol (CaCO3)})}{(44 \text{ g/mol (CO2)})} = \text{Carbonation \%} \quad \text{Equation 4}$$

Results and Discussion

Carbonation rates were compared within the same sample type under different conditions and across different sample types and conditions. The increase in percent carbonation is defined as the increase in carbonation between two measurements.

Table 3 shows the carbonation changes of different lime samples (HL, PHL, C-PHL, and high free moisture PHL) after 168 hours (7 days) under various conditions (benchtop, furnace, and humidity cabinet).

TABLE 3

Carbonation changes between 0-168 hours of various samples under different conditions.

| Condition | HL | PHL | C-PHL | High free moisture PHL |
|---|---|---|---|---|
| Benchtop | 12.51% | 25.47% | 27.74% | 31.84% |
| Furnace | 7.5% | 13.64% | 15.46% | 33.9% |
| Humidity cabinet | 47.07% | 54.8% | 64.92% | 17.7% |

As shown in Table 3, among the commercially available hydrated lime product samples, i.e., HL, PHL, and C-PHL, the porous lime samples, i.e., PHL and C-PHL exhibited much higher carbonation compared to less-porous HL sample. This observation may highlight the importance of porosity and surface area in enhancing the carbonation process. The higher porosity and surface area of PHL and C-PHL may provide more reactive sites for $CO_2$ adsorption and reaction, leading to faster and more extensive carbonation.

Furthermore, all three samples exhibited the least carbonation in the furnace with a temperature set to 90° C. This may be attributed to several factors. First, the elevated temperature increases the kinetic energy of $CO_2$ molecules, making them less likely to be adsorbed into the pores of the lime particles. Second, the higher temperature may promote dehydration of the lime particles, reducing the availability of surface hydroxyl groups that play a crucial role in the carbonation reaction. These factors may hinder the carbonation process at elevated temperatures.

Further, the most significant carbonation occurred in the humidity cabinet, where the average relative humidity was 95.6% and the temperature remained around 20° C. At this temperature, carbonation is not limited by retrograde solubility, i.e., the decrease in solubility of $CO_2$ with increasing temperature. As discussed above, high humidity influences the carbonation process. However, as discussed above, achieving and maintaining such high humidity in practical applications can be challenging.

The high free moisture PHL with higher moisture content exhibits significantly higher carbonation rates under benchtop and furnace conditions compared to the commercially available dried samples. This finding may highlight the importance of free moisture in enhancing the carbonation process and demonstrate the superior performance of the high free moisture sample in $CO_2$ capture under these conditions.

Figure 5A:
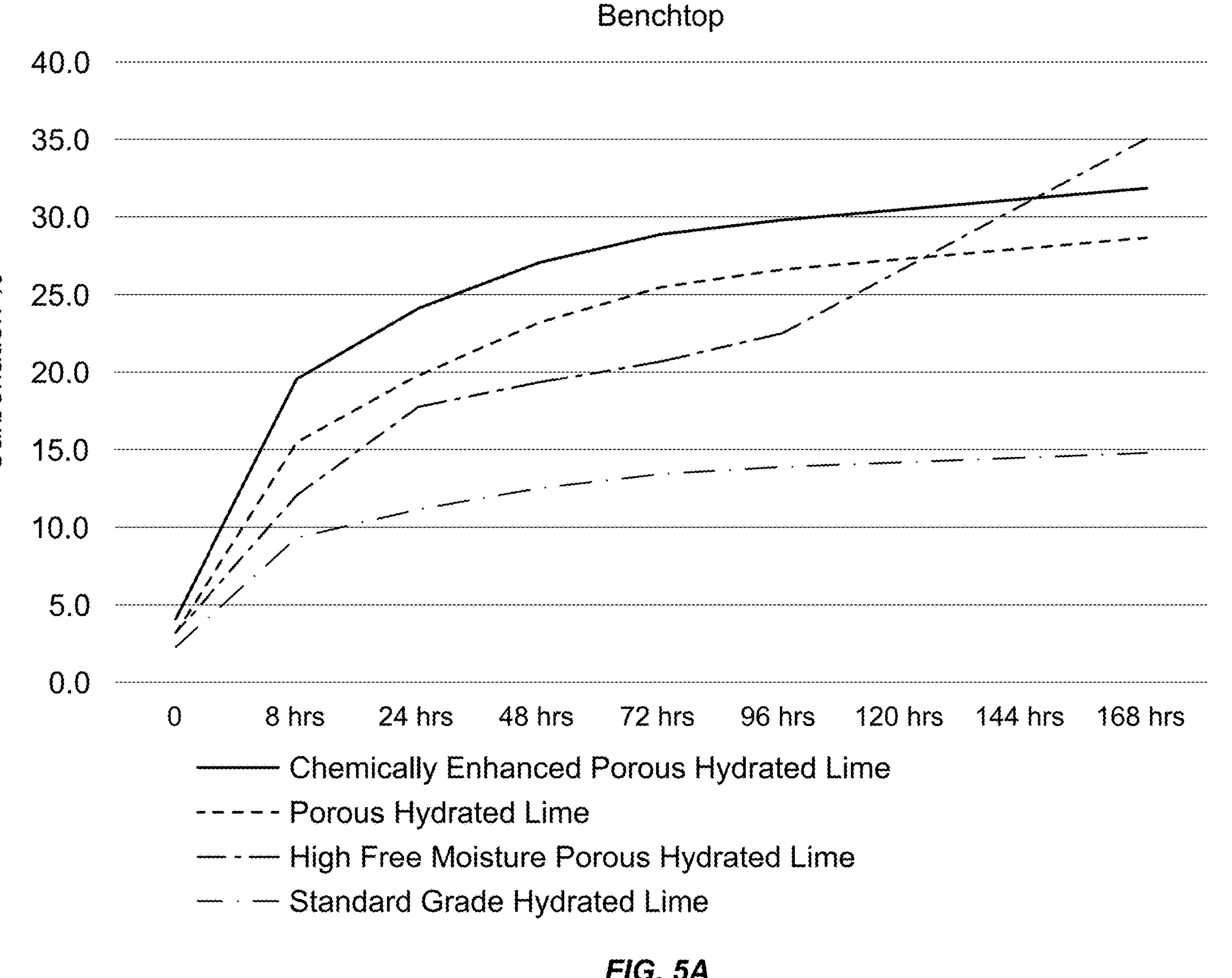
FIGS. 5A and 5B illustrate the carbonation progress and carbonation rates, respectively, of standard grade hydrated lime, porous hydrated lime, chemically enhanced porous hydrated lime, and high free moisture porous hydrated lime over a period of 168 hours (7 days) under benchtop condition.

FIG. 5A illustrates the carbonation progress of various lime samples, i.e., HL, PHL, C-PHL, and high free moisture PHL, over a period of 168 hours (7 days) under benchtop condition. The x-axis represents the time in hours, while the y-axis represents the carbonation percentage. Each line on the graph corresponds to a specific hydrated lime sample.

As shown in FIG. 5A, the high free moisture PHL sample exhibits the fastest carbonation, reaching nearly 35% conversion after 168 hours. C-PHL also shows rapid carbonation, reaching approximately 30% conversion in the same timeframe. PHL and HL exhibit slower carbonation rates, with final conversions around 28% and 15%, respectively.

Figure 5B:
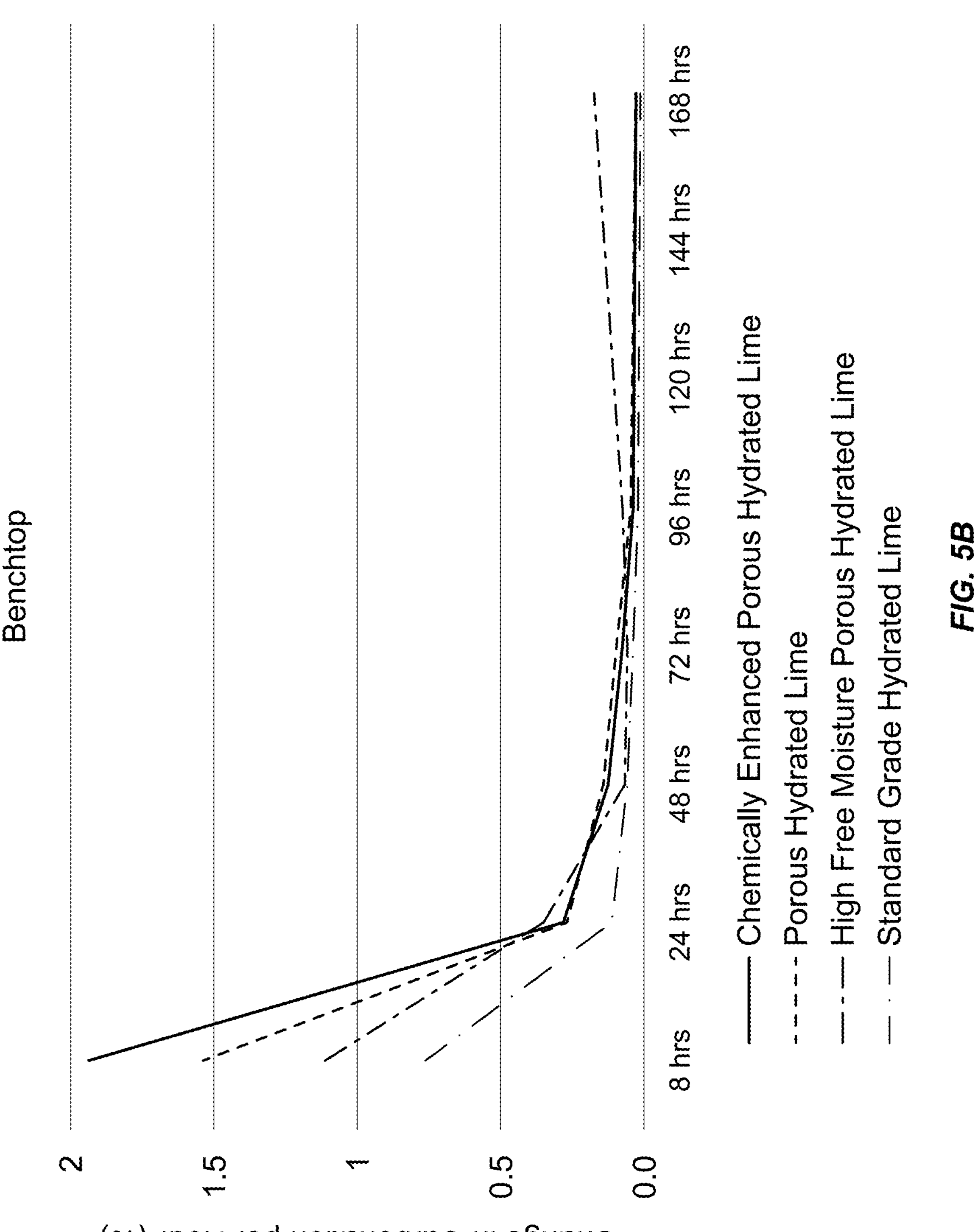

FIG. 5B illustrates the carbonation rates of the same hydrated lime samples over 168 hours under benchtop condition. The x-axis represents the time in hours, while the y-axis represents the change in carbonation per hour, expressed as a percentage. Each line corresponds to a specific lime sample.

As shown in FIG. 5B, PHL and C-PHL have the highest initial carbonation rates, which rapidly decrease over the first 24 hours and continue decreasing over the next few days. HL sample has a low initial carbonation rate and remains low throughout the experiment. In contrast, high free moisture PHL sample has a high initial carbonation rate, experiences a similar decrease after 48 hours, and then exhibits an increase thereafter.

Figure 6:
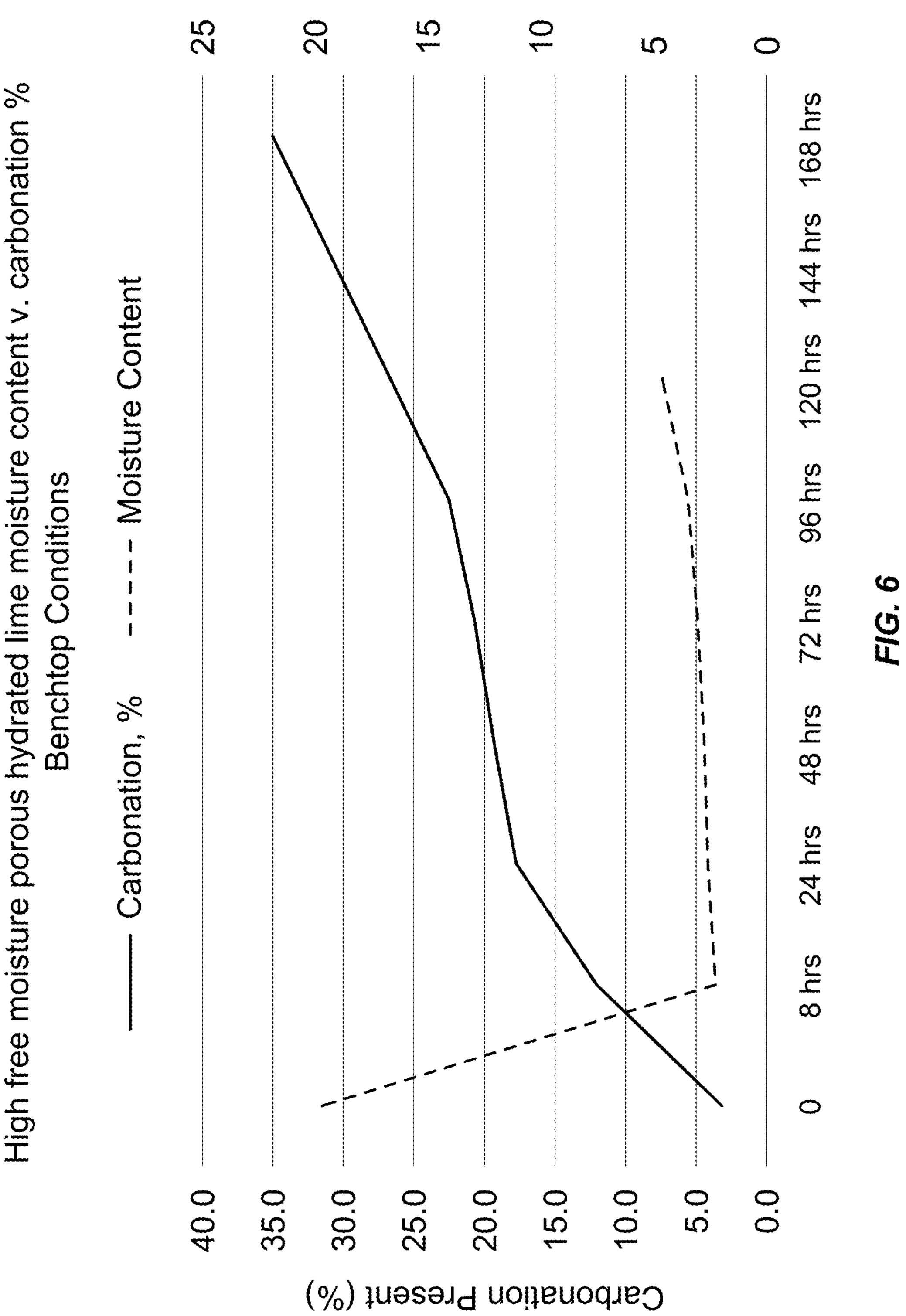
FIG. 6 illustrates the carbonation rate and moisture contents of high free moisture porous hydrated lime over a period of 168 hours (7 days) under benchtop condition.

The superior performance observed in the high free moisture PHL sample, specifically the acceleration following an initial decrease, could be attributed to several factors, including moisture content variations. As shown in FIG. 6, the moisture content of the high free moisture PHL sample was found to fluctuate over time under benchtop conditions. The high initial moisture content, approximately 20 wt. %, may facilitate rapid carbonation during the initial phase. Subsequently, a rapid decrease of the moisture content to below 3 wt. % within 8-24 hours of the carbonation reaction is observed, potentially contributing to the initial deceleration of the carbonation rate. This reduction may result from equilibration with ambient air, as moisture evaporates from the sample to reach equilibrium with the surrounding environment. After 72 hours, the moisture content was found to increase, with the magnitude of the increase growing over time, correlating with an acceleration in the carbonation rate. This observation underscores the potential benefit of moisture-retaining additives to maintain optimal moisture levels throughout the carbonation process.

Further investigation may provide further information regarding the mechanisms behind this phenomenon. However, the increase in carbonation rate after 72 hours for the high free moisture PHL sample may suggest that full carbonation (100% conversion of $Ca(OH)_2$ to $CaCO_3$) may be achievable with a longer test duration. This observation highlights the potential of hydrated lime samples with high moisture content for achieving complete carbonation and maximizing $CO_2$ capture efficiency.

Figure 7A:
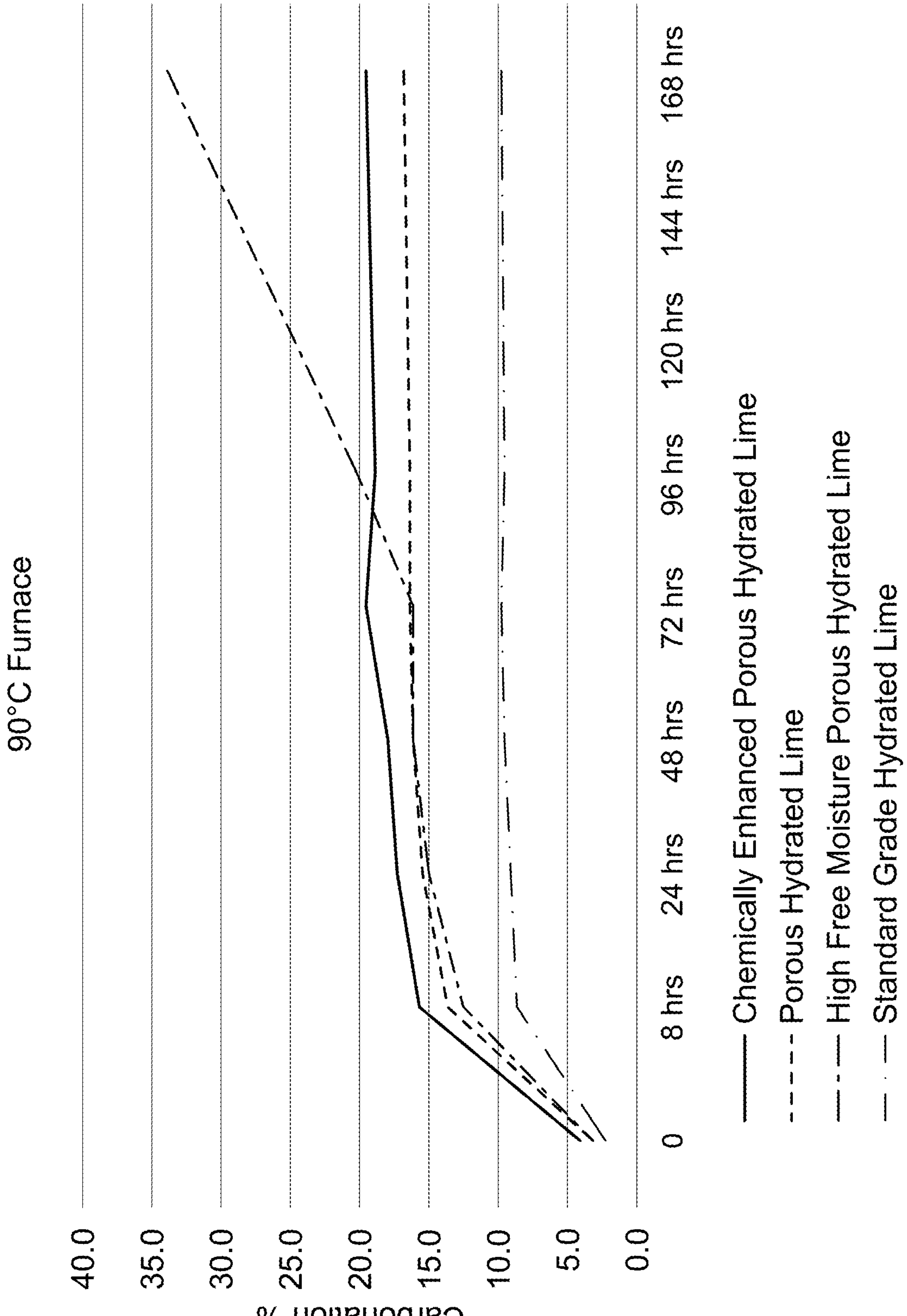
FIGS. 7A and 7B illustrate the carbonation progress and carbonation rates, respectively, of standard grade hydrated lime, porous hydrated lime, chemically enhanced porous hydrated lime, and high free moisture porous hydrated lime over a period of 168 hours (7 days) under furnace condition.

FIG. 7A illustrates the carbonation progress of various lime samples, i.e., HL, PHL, C-PHL, and high free moisture PHL, over a period of 168 hours (7 days) in a furnace with the temperature set to 90° C. The x-axis represents the time in hours, while the y-axis represents the carbonation percentage. Each line on the graph corresponds to a specific lime sample.

As shown in FIG. 7A, the high free moisture PHL sample exhibits the fastest carbonation, reaching nearly 35% conversion after 168 hours. The other three lime samples, i.e., HL, PHL, and C-PHL exhibit significantly less carbonation compared to their performance under benchtop conditions, reaching only around 10%, 17%, and 20% carbonation, respectively, after 168 hours.

The lower carbonation rates observed in HL, PHL, and C-PHL samples under furnace conditions compared to benchtop conditions may be attributed to the higher vapor pressure of the moisture at 90° C. This elevated temperature may reduce the amount of moisture available on the lime particle surfaces, further hindering the carbonation reaction rate. Consequently, the reduced moisture content at higher temperatures may be one of the primary factors contributing to the decreased carbonation rates.

The carbonation rate of the high free moisture PHL sample seems substantially unaffected by the higher temperature. This could be due to its higher moisture content, which might help to offset the negative impact of increased $CO_2$ mobility by promoting $CO_2$ dissolution and maintaining a hydrated environment for the reaction to occur. This observation further supports the importance of moisture in enhancing lime carbonation, especially at elevated temperatures.

Figure 7B:
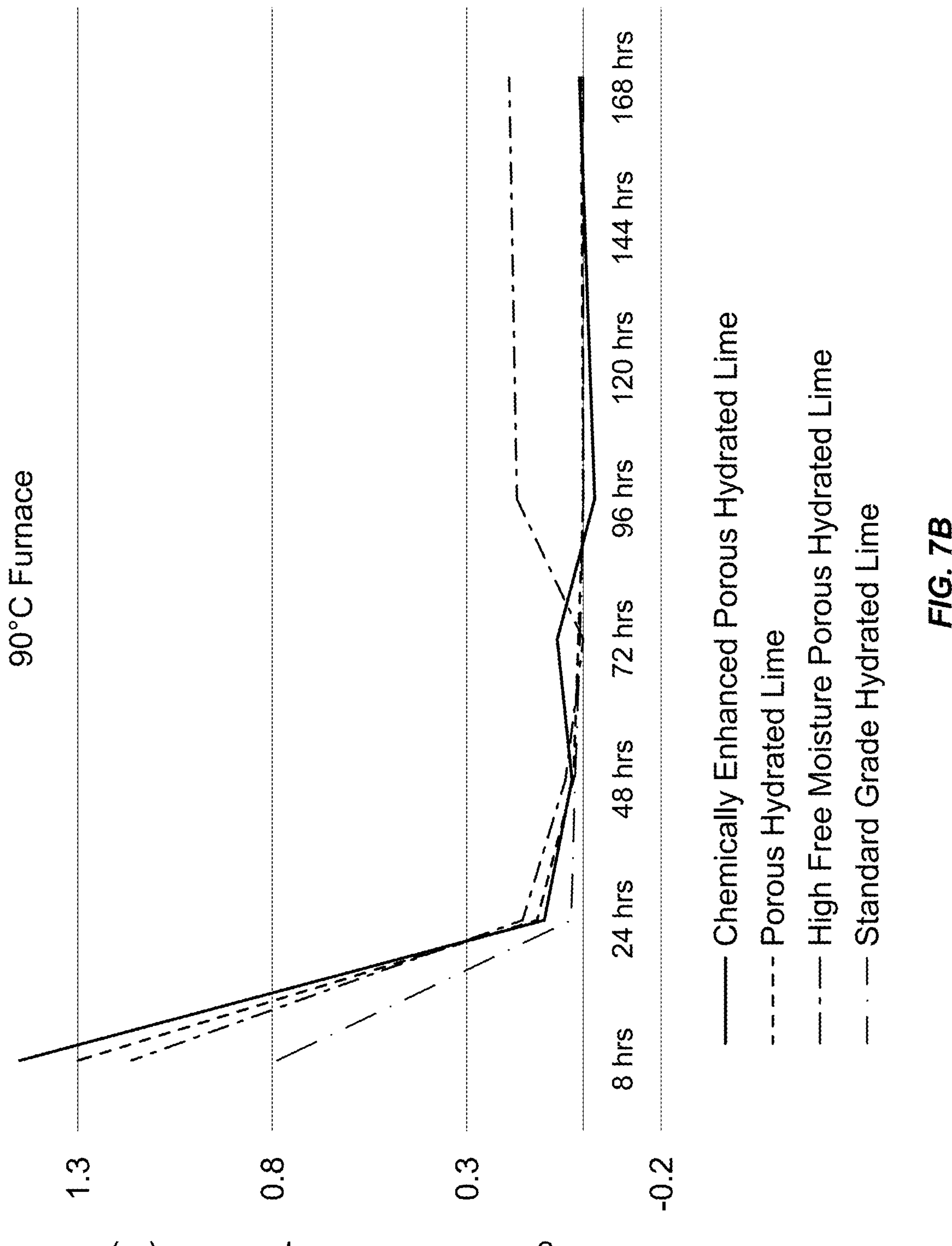

FIG. 7B illustrates the carbonation rates of the same lime samples over 168 hours under benchtop condition. The x-axis represents the time in hours, while the y-axis represents the change in carbonation per hour, expressed as a percentage. Each line corresponds to a specific lime sample.

As shown in FIG. 7B, PHL, C-PHL, and high free moisture PHL samples have the highest initial carbonation rates, which rapidly decrease over the first 24 hours. While the carbonation rates of PHL and C-PHL continue decreasing, the carbonation rate of the high free moisture PHL increases significantly after 72 hours. The HL sample has a low initial carbonation rate that remains low throughout the experiment.

These observations are consistent with those seen under benchtop conditions, where the high free moisture PHL sample also exhibited an increase in carbonation rate after an initial decrease. This may further support the hypothesis that the higher moisture content in the high free moisture sample plays a crucial role in enhancing the carbonation process, especially in the later stages of the reaction.

The trends observed under both benchtop and furnace conditions may suggest that the mechanisms influencing the carbonation rate are similar despite the difference in temperature. This highlights the robustness of the high free moisture PHL sample's performance and its potential for effective $CO_2$ capture in various environments.

Although the presently disclosed subject matter and its advantages have been described in detail, it should be understood that various changes, substitutions and alterations can be made herein without departing from the spirit and scope of the disclosed subject matter. Moreover, the scope of the present application is not intended to be limited to the particular embodiments of the process, machine, manufacture, and composition of matter, methods and processes described in the specification. As one of ordinary skill in the art will readily appreciate from the disclosed subject matter of the presently disclosed subject matter, processes, machines, manufacture, compositions of matter, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, methods, or steps.

Various patents, patent applications, publications, product descriptions, protocols, and sequence accession numbers are cited throughout this application, the inventions of which are incorporated herein by reference in their entireties for all purposes.

What is claimed is:

1. A process for capture of carbon dioxide in air, comprising:
- providing a first composition comprising:
  - calcium hydroxide,
  - free moisture in an amount of about 1.5 to about 30 wt. %, based on the total weight of the composition, and
  - one or more moisture-retaining additives attached to at least a portion of a surface of the calcium hydroxide; and
- contacting the first composition with air to capture $CO_2$ contained in the air by converting at least part of the calcium hydroxide into calcium carbonate, thereby forming a second composition comprising the calcium carbonate.

2. The process of claim 1, further comprising: extracting $CO_2$ from at least a portion of the second composition.

3. The process of claim 1, wherein the first composition comprises a calcium hydroxide component having a specific surface area of at least about 30 $m^2/g$ and a pore volume of at least about 0.13 $cm^3/g$ with pores having a diameter less than about 1000 Angstroms.

4. The process of claim 2, wherein the extracting step comprises heating the calcium-carbonate-based composition to a temperature in a range of about 800-1200° C.

5. The process of claim 2, wherein the extracting step comprises regenerating calcium oxide, and reusing the regenerated calcium oxide to capture $CO_2$.

6. The process of claim 1, further comprising: forming a liquid layer on at least a portion of a surface of the first composition, wherein the liquid layer facilitates dissolution of $CO_2$ for conversing calcium hydroxide to calcium carbonate.

7. The process of claim 1, wherein the first composition has a formula $[Ca(OH)_2]_{1-x[}CaCO_3]_x \cdot yH_2O$, where x ranges from about 0.5 to about 0.95 and y is greater than or equal to about 0.0617, based on molar quantities.

8. A process for capture of carbon dioxide in air, comprising:

providing a first composition comprising:

calcium hydroxide, free moisture in an amount of about 1.5 to about 30 wt. %, based on the total weight of the composition, and one or more moisture-retaining additives attached to at least a portion of a surface of the calcium hydroxide; and contacting the first composition with air to capture $CO_2$ contained in the air by converting at least part of the calcium hydroxide into calcium carbonate, thereby forming a second composition comprising the calcium carbonate, wherein the first composition has a formula $[Ca(OH)_2]_{1-x[}CaCO_3]_x \cdot yH_2O$, where x ranges from about 0.5 to about 0.95 and y is greater than or equal to about 0.0617, based on molar quantities.

9. The process of claim 8, further comprising: extracting $CO_2$ from at least a portion of the second composition.

10. The process of claim 8, wherein the first composition comprises a calcium hydroxide component having a specific surface area of at least about 30 $m^2/g$ and a pore volume of at least about 0.13 $cm^3/g$ with pores having a diameter less than about 1000 Angstroms.

11. The process of claim 9, wherein the extracting step comprises heating the calcium-carbonate-based composition to a temperature in a range of about 800-1200° C.

12. The process of claim 9, wherein the extracting step comprises regenerating calcium oxide, and reusing the regenerated calcium oxide to capture $CO_2$.

13. The process of claim 8, further comprising: forming a liquid layer on at least a portion of a surface of the first composition, wherein the liquid layer facilitates dissolution of $CO_2$ for conversing calcium hydroxide to calcium carbonate.

* * * * *